June 20, 1961 M. I. JACOB 2,989,624
RADIO TRANSMITTER WITH TUNABLE ANTENNA
Filed Aug. 6, 1949
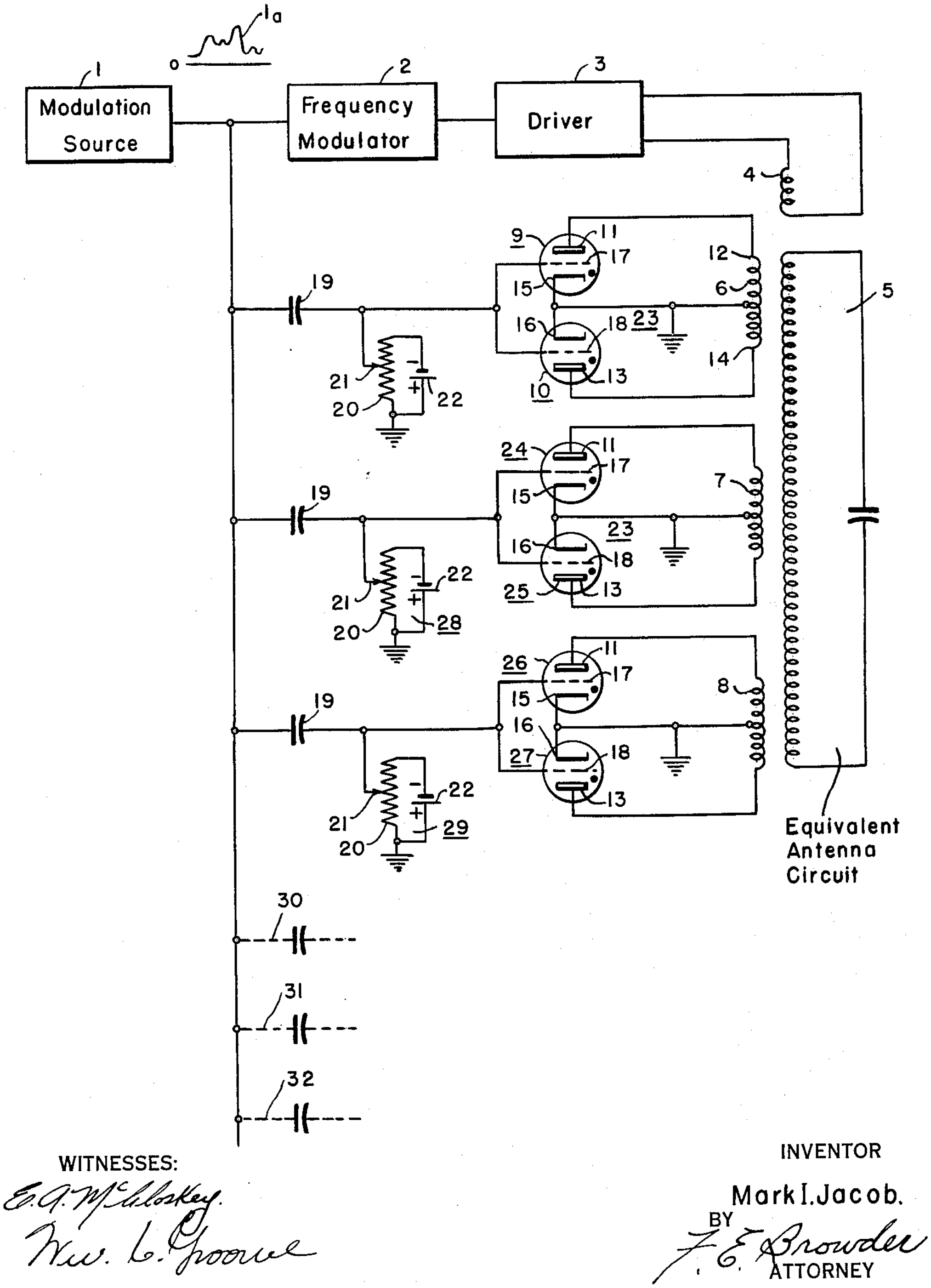
WITNESSES:
E. A. McCloskey
Wm. L. Groome
INVENTOR
Mark I. Jacob.
BY F. E. Browder
ATTORNEY 2,989,624

RADIO TRANSMITTER WITH TUNABLE ANTENNA

Mark I. Jacob, Baltimore, Md., assignor to Westinghouse Electric Corporation, East Pittsburgh, Pa., a corporation of Pennsylvania Filed Aug. 6, 1949, Ser. No. 108,962
9 Claims. (Cl. 250—17)

This invention relates generally, to improved systems of communication, and more particularly to methods and apparatus for communication by frequency modulation of a carrier wave which drives a low loss resonant antenna circuit which is tunable in discrete steps to maintain at least approximate frequency correspondence with the frequency of the carrier.

This application is related in subject matter to previously filed applications for Letters Patent of the United States, Serial No. 58,064, filed November 3, 1948, now Patent No. 2,712,061 entitled Means for High Speed Keying at Low Radio Frequency, filed in the name of Cyril E. McClellan, and Serial No. 71,566, filed January 19, 1949, now Patent No. 2,825,030 entitled Frequency Modulated VLF Transmitter, filed in the names of William Altar and Patrick Conley, both of which are assigned to the assignee of the present application.

It is an object of the present invention to provide a novel system for increasing permissible modulation rates in frequency modulated communication systems utilizing high Q low frequency antennae.

It is a further object of the present invention to provide a novel system for conforming the frequency of response of a tuned circuit to the frequency of a driving signal therefor, when the latter is varied in frequency in response to a modulation signal having substantially no discontinuities.

It is another object of the invention to provide a novel system of communication by frequency modulation of a carrier, wherein the tuning of a circuit driven by the carrier is continuously varied in discrete steps, to maintain approximate frequency correspondence between the tuning of the circuit and the frequency of the carrier.

It is still another object of the present invention to provide a system for maintaining the tuning of a driven circuit coincident with the frequency of a driving signal which is frequency modulated by an audio or video signal, without the expenditure of appreciable power.

The above and still further objects, features and advantages of the present invention will become apparent upon consideration of the following detailed description of a specific embodiment of the invention, especially when taken in conjunction with the accompanying drawing, wherein the single figure is a schematic circuit diagram of a radio transmitter arranged in accordance with the invention.

When a wave energy signal which is driving a resonant circuit is varied in frequency, the current in the resonant circuit does not follow the changes in frequency with complete fidelity, and the distortion of the circuit response with respect to the impressed signal increases with increasing Q of the circuit and with decreasing signal frequency.

When the circulating currents in a driven resonant circuit are comparatively large, as occurs in high Q circuits, and in low radio frequency high power transmitters, the actual time required for new equilibrium conditions to be established, when the driving frequency is varied, is so great as to involve a severe distortion of the frequency modulated signal. This distortion has the effect of prohibiting transmission of intelligence except at very low modulation frequencies.

It has been found that the difficulty above pointed out may be overcome, if, at the same time that the driving frequency is varied, the tuning of the resonant driven circuit is modified or varied by a corresponding amount, so that at least an approximate frequency correspondence is maintained between the frequency of the source and the tuning of the driven tuned circuit.

Various methods of accomplishing changes in tuning of the driven circuit synchronized with the changes of frequency of the driving signal may be envisaged, some of which have been disclosed in the above-identified applications for Letters Patent of the United States.

Many of these methods are highly effective when applied to relatively low power equipments, but become impractical for various reasons when applied to extremely high power equipment. For example, in low power equipment electronic devices such as reactance tubes may be utilized in circuit with the resonant load circuit to shift the tuning thereof. Reactance tubes circuits, however, ordinarily utilize hard tubes, which have considerable losses, and which operate at low efficiency. Where high power circuits having large circulating currents must be controlled, the use of hard tubes becomes impractical because hard tubes having the requisite current capacity are either unavailable or extremely expensive.

The use of saturable reactors has been suggested in the above-identified applications for Letters Patent, and has been found to provide extremely effective results. The practical drawback to the use of such circuits, however, resides in the power required to effect modulation when the load currents are extremely high. It thus becomes extremely desirable to utilize gaseous conduction devices for varying the tuning of the driven circuit, since such devices are capable of handling extremely large currents, are extremely rapid in operation, are virtually trouble-free, and are subject to control by small amounts of power.

I have, accordingly, devised a circuit which finds particular application in frequency modulation systems for transmitting audio or video signals, wherein the frequency of a resonant load circuit, which may be the antenna circuit of a radio transmitter, is varied by discrete increments in correspondence with changes in the frequency of wave energy impressed thereon, and which employs thyratrons or similar gaseous conduction tubes for effecting the incremental changes in frequencies. Such tubes have extremely low internal resistance and, accordingly, introduce but slight losses into the circuits with which they are operated, but are capable of handling extremely large currents, and may be keyed simply and with extreme rapidity.

Briefly described, and as applied to frequency modulation systems, the present invention provides a source of radio frequency energy which may be frequency modulated by a source of modulation energy of any desired type, such as audio signals, video signals or the like. The required frequency modulation may be produced in any one of a number of well known ways, in accordance with known practices in the pertinent art, the specific mode utilized forming, however, no part of the present invention. The frequency shifted source of oscillations may comprise a relatively low power oscillator, the output of which is amplified to a value suitable for transmission, or alternatively a high power oscillator may be employed, the output of which may be directly radiated.

The resonant frequency of the tuned load circuit, which may, in a specific use of the present invention, include an antenna, may be controlled in accordance with a preferred embodiment of the invention, by coupling thereto a series of inductances which may be selectively short-circuited when it is desired to vary the normal resonant frequency of the tuned circuit, and which may otherwise remain open-circuited. When short-circuited, each coupled inductance reflects into the resonant circuit a component of reactance which modifies the normal resonant frequency of the resonant circuit. For the purpose of establishing and dis-establishing a short circuit across the terminals of each coupled inductance, I prefer to employ a pair of gaseous conduction electronic devices, such as thyratrons, the plates of which are connected in push-pull relation to the voltage induced in the inductance, the cathodes of the thyratrons being connected together, and to a center point of the inductance.

The control electrodes of the thyratrons may be electrically tied together, and the modulating voltage which is applied to modulate the frequency of the driving oscillator may likewise be applied to the control electrodes. Each pair of thyratrons may be biased to enable the thyratrons to fire when the modulating signal attains a predetermined value, and to be non-conductive for modulation voltages below this value. If a large number of such thyratron controlled coupled inductances are utilized, each of which is biased to respond to a different value of modulation voltage, and each of which is so designed and coupled to the resonant load circuit as to induce therein a suitable increment of reactance, the total resultant resonant frequency of the load circuit may be made continuously to vary, by incremental steps, and in response to the modulation signal, in such a way as to approximate at all times the frequency of the driving signal.

Referring now more specifically to the figure of the drawing, the reference numeral 1 denotes a source of modulation signal, 1*a*, which may be specifically, a source of audio signal, a source of video signal, or a source of signal corresponding with the output of a facsimile scanner. The output of the modulation source may be applied to a frequency modulator 2 of any desired character, which may be in turn coupled to a driver 3. The latter may be constituted, specifically, of a high-power oscillator, the frequency of which may be modulated by the modulator 2 in response to the signals provided by the modulation source 1.

The output of the driver 3 is applied via a coupling inductance 4 to a tuned circuit 5, which may be in a specific example of the invention, the antenna circuit of a low power transmitter, and which may constitute electrically an extremely high Q circuit. Specifically the driver 3 in the resonant circuit 5 may operate in the V.L.F. band, and at frequencies as low as 15,000 cycles per second, and the Q of the circuit 5 may be so high that frequency variations which, in amount and rate of occurrence, are completely inadequate for the transmission of audio or video signals are, nevertheless, sufficient to introduce very great degrees of distortion. Coupled to the tuned circuit 5 are a number of inductances 6, 7, 8 . . ., the precise number of which is a matter for selection when effecting a specific design, but which may be of the order of twenty. The illustration is limited to three such circuits, for the purpose of simplifying the drawing only, and without intending any limitation as to the number of coupled inductances utilized in practical embodiments of my invention.

It is well known that when a secondary inductance is coupled to a primary inductance, the latter being tuned, the effect of short-circuiting the secondary inductance is to shift the resonant frequency of the primary circuit, in accordance with the relation $$\Delta F=\frac{f}{2}(K)^2$$

where K is the coefficient of coupling between the inductances, and is defined as $$K^2=\frac{M^2}{L_p L_s}$$

M being the mutual inductance between the primary windings, having an inductance $L_p$, and the secondary winding having an inductance $L_s$, and $f$ being the frequency of the primary circuit when the secondary inductance is open-circuited.

Accordingly, while the inductances 6, 7 and 8 are open-circuited, they have no effect on the tuning of the resonant circuit 5. As the secondary windings 6, 7 and 8 are short-circuited in succession, however, additional increments of reactance are introduced into the resonant circuit 5, changing the resonant frequency of the resonant circuit 5 by successive increments.

The winding 6 is connected in push-pull relation across a pair of grid-controlled gaseous conduction devices, such as thyratrons 9, 10. Gaseous conduction electronic control devices, of which thyratrons are typical, have the property of conducting electric currents from their anodes to their cathodes, while the anode is positive with respect to the cathode, provided the potential applied to a control electrode of the controlled device is more positive than a predetermined critical value characteristic of the device at the anode potential. So long as the potential applied to the control electrode is below the critical value, no conduction will take place, the control device being effectively blocked. Upon raising the potential applied to the control electrode above the critical value, however, current flows through the device upon application to the anode thereof of a positive potential of suitable value, and thereafter the control device loses control of current flow, current continuing to flow regardless of the potential of the control electrode, until the potential of the anode of the device is reduced substantially to zero.

In the embodiment of my invention presently described the anode 11 of the thyratron 9 is connected to one end 12 of the coil 6 while the anode 13 of the thyratron 10 is connected to the other end 14 of the coil 6. The cathodes 15 and 16 of the thyratrons 9 and 10 are tied together and to the mid-point of the coil 6. The control electrodes 17 and 18 of the thyratrons 9 and 10, respectively, are similarly tied together and coupled via a coupling condenser 19 to the output of the modulation source 1. Bias for the control electrodes 17 and 18 is supplied from a potentiometer 20 over a variable tap 21, potentiometer 20 being connected across a source of potential 22 of any convenient character, the positive terminal of which is grounded. The cathodes 15, 16, or the center-point of the coil 6, may be similarly grounded. Accordingly, the thyratrons 9 and 10 are biased negatively by a steady direct-current voltage, which may be so selected that the thyratrons do not fire despite the imposition of positive voltages in alternation on the anodes 11 and 13.

There is further applied to the control electrodes 17 and 18 a voltage corresponding with the output 1*a*, of the modulation source 1, this voltage appearing as a variable positive bias, superposed on the negative bias introduced by the variable tap 21. Accordingly, when the modulation voltage exceeds the negative bias supplied by the potentiometer 20 the thyratrons 9 and 10 are enabled to fire in response to the alternating voltage impressed on the anodes 11, 13 thereof by the winding 6, which effectively short-circuits the winding 6, and introduces into the resonant circuit 5 an increment of reactance.

Corresponding control circuits for shorting the coil 7 are provided, which may be generally denoted by the reference number 23, and comprise thyratrons 24 and 25 which are biased by means of adjustable bias source 28. The bias supplied by the bias source 28 may be more negative than that provided by the bias potentiometer 20, so that as the voltage supplied by the modulation source 1 increases from its most negative value it causes firing first of the thyratrons 9, 10, and thereafter of the thyratrons 24, 25.

The thyratrons 26, 27, which control short-circuiting of the winding 8, are provided with bias by still another bias source 29, which enables firing of the thyratrons 26, 27 in response to the modulation voltage supplied by the source 1, when the latter rises to a value greater in a positive sense than the value required to fire the thyratrons 23, 24, by some predetermined increment of voltage.

Accordingly, the winding 8 is short-circuited at a point in the modulation cycle which is more positive that that required to short-circuit the winding 7, and the winding 7 is shorted by a modulation voltage which is more positive than that required to short-circuit the winding 6.

By suitable multiplication of the windings 6, 7, 8, as indicated by the dotted leads 30, 31, 32 . . . additional frequency modifying windings may be brought into inductive relation to the resonant circuit 5, and one such winding may be provided for each predetermined incremental rise in modulation voltage, taken from its most negative to its most positive values.

Accordingly, for each value of modulation signal, a predetermined series of incremental reactances are added to the reactance of the tuned circuit 5, changing the resonant frequency thereof, and by proper choice of coupling factors and inductances of the various coils 6, 7, 8, etc., the tuning of the winding 5 may be caused always to be approximately equal to the frequency of the oscillator or driver 3. As the frequency of the driver 3 is varied between its pre-established limits, the resonant frequency of the antenna circuit is shifted, in steps, to follow at least approximately the frequency of the driver. While in general the resonant frequency of the circuit 5 and the frequency of the driver 3 are not precisely similar, at no time do the driving frequency and the resonant frequency of the circuit 5 become sufficiently separated to cause serious distortion. Further, the tuning of the circuit 5 is alternately ahead of and behind the frequency of the driver 3, as the modulation signal varies in magnitude, which tends to iron out any phase shifts which might develop in the radio frequency current flowing in the circuit 5.

In this event the output of the modulation source 1 is an alternating current having positive and negative cycles in alternation, certain of the short-circuiting thyratrons for the coupled inductances, as 6, 7, 8 . . . may be biased positively, rather than negatively, while others are biased negatively, so that in the absence of modulation signal half the coupled inductances may be open-circuited and half short-circuited. Positive modulation signal may then increase the number of short-circuited coupled inductances by adding to the number of conductive thyratrons, while negative modulation signal may reduce the number of short-circuited inductances by rendering non-conductive thyratrons which are normally, and in the absence of modulation signal, conductive.

While I have described various specific embodiments of my invention, it will be evident that variations and rearrangements thereof may be resorted to without departing from the true spirit and scope of the invention.

I claim as my invention:

1. In a wave energy transmitter, a source of modulating voltage of variable magnitude, an oscillator, a frequency modulator for modulating the frequency of said oscillator in response to said modulating voltage, a tunable load circuit coupled to said oscillator, a plurality of normally inoperative tuning means coupled to said tunable load circuit, each arranged to introduce an additional increment of tuning variation into said tunable load circuit, and means for selectively rendering operative said normally inoperative tuning means in accordance with the magnitude of said modulating voltage.

2. In a wave energy transmitter, a source of modulating voltage of continuously variable magnitude, a source of wave energy of predetermined frequency, means for continuously varying the frequency of said wave energy in response to said modulating voltage over a predetermined frequency spectrum, a tunable load circuit for said wave energy, a plurality of normally open-circuited reactances coupled to said tunable load circuit, each of said normally open-circuited reactances operative when short-circuited to reflect an increment of reactance into said tunable load circuit, and means for selectively short-circuiting said normally open-circuited reactances in accordance with the magnitude of said modulating voltage.

3. In a wave energy transmitter, a source of modulating voltage of continuously variable magnitude, a source of wave energy of predetermined frequency, means for continuously varying the frequency of said wave energy in response to said modulating voltage over a predetermined frequency spectrum, a tunable load circuit a plurality of normally open-circuited reactances coupled to said tunable load circuit, each of said normally open-circuited reactances operative when short-circuited to reflect an increment of reactance into said tunable load circuit, means for selectively short-circuiting said normally open-circuited reactances in accordance with the magnitude of said modulating voltage comprising a pair of gaseous conduction devices connected in push-pull relation across each of said reactances, means for negatively biasing each pair of gaseous conduction devices to a different negative bias, and means for applying said modulating voltage in opposition to said biases, whereby each pair of gaseous conduction devices fires at a different magnitude of said modulating voltage.

4. In a radio transmitter operating in the very low frequency band, and having a high Q tunable antenna, a source of wave energy coupled to said antenna, means for continuously varying the frequency of said wave energy, a plurality of reactances coupled to said antenna, means normally preventing current flow in said reactances in response to current flow in said antenna, and means responsive to said first-named means for selectively enabling current flow in said reactances in response to current flow in said antenna.

5. In combination, a source of wave energy, a tunable load circuit coupled to said source of wave energy, means for continuously varying the frequency of said wave energy, a plurality of reactances coupled to said tunable load circuit for tuning said tunable load circuit, and means for selectively controlling current flow in said plurality of reactances in accordance with the frequency of said wave energy.

6. In combination, a source of wave energy, a tunable load circuit coupled to said source of wave energy, means comprising a source of varying voltage for continuously varying the frequency of said wave energy, a plurality of reactances coupled to said tunable load circuit, a plurality of gaseous conduction means, each having a control electrode, and each connected in series with one of said reactances, means for applying bias voltage to said control electrodes for normally maintaining said gaseous conduction devices non-conductive in response to current flow in said tunable load circuit, and means for applying said varying voltage to said control electrodes in opposition to said bias voltages.

7. In combination, a source of wave energy, a tunable load circuit coupled to said source of wave energy, means comprising a source of varying voltage for continuously varying the frequency of said wave energy, a plurality of reactances coupled to said tunable load circuit, a plurality of gaseous conduction devices each having a conduction control electrode, means for connecting each of said gaseous conduction devices in series with one of said reactances, means for applying predetermined bias voltages of diverse magnitudes to said conduction control electrodes, and means for applying said varying voltage to said conduction control electrodes for rendering said gaseous conduction devices selectively conductive.

8. In combination, a source of wave energy, a tunable load circuit coupled to said source of wave energy, means comprising a source of modulating voltage for varying the frequency of said wave energy, and means responsive to said modulating voltage for introducing into said load circuit a number of discrete increments of reactance, said number determined by the magnitude of said modulating voltage.

9. In combination, a source of wave energy, a tunable load circuit coupled to said source of wave energy, and means for varying the tuning of said load circuit in discrete steps and in approximate correspondence with the frequency of said wave energy, said last means comprising a number of reactances coupled with said load circuits, and means for enabling and disabling current flow in selected ones of said reactances.

References Cited in the file of this patent

UNITED STATES PATENTS

| | | |
|---|---|---|
| 2,096,758 | Purington | Oct. 26, 1937 |
| 2,096,760 | Purington | Oct. 26, 1937 |
| 2,388,233 | Whitaker | Oct. 30, 1945 |
| 2,426,193 | Fernsler | Aug. 26, 1947 |
| 2,430,173 | Holmes | Nov. 4, 1947 |
| 2,440,081 | Fick | Apr. 20, 1948 |
| 2,480,820 | Hollingsworth | Aug. 30, 1949 |